(12) United States Patent
Swart

(10) Patent No.: US 10,354,104 B2
(45) Date of Patent: Jul. 16, 2019

(54) REAL-TIME LOCATION SYSTEM (RTLS) TAG WITH BATTERY AND ENERGY HARVESTING, WHICH TRANSMITS A LOCATION SIGNAL WHEN THE BATTERY IS INOPERATIVE

(71) Applicant: Infinite Leap Holdings, LLC, Fargo, ND (US)

(72) Inventor: John A. Swart, Grand Rapids, MI (US)

(73) Assignee: Infinate Leap Holdings, LLC, Fargo, ND (US)

(*) Notice: Subject to any disclaimer, the term of this patent is extended or adjusted under 35 U.S.C. 154(b) by 0 days.

(21) Appl. No.: 16/241,737

(22) Filed: Jan. 7, 2019

(65) Prior Publication Data

US 2019/0138767 A1    May 9, 2019

Related U.S. Application Data

(63) Continuation-in-part of application No. 16/010,732, filed on Jun. 18, 2018, now Pat. No. 10,231,078, which is a continuation-in-part of application No. 15/610,072, filed on May 31, 2017, now Pat. No. 10,028,105.

(60) Provisional application No. 62/623,561, filed on Jan. 30, 2018, provisional application No. 62/343,242, filed on May 31, 2016.

(51) Int. Cl.
| | | |
|---|---|---|
| *H04W 24/00* | (2009.01) | |
| *G06K 7/10* | (2006.01) | |
| *H04W 4/029* | (2018.01) | |
| *H02J 7/35* | (2006.01) | |
| *H04B 1/40* | (2015.01) | |
| *H02J 7/34* | (2006.01) | |
| *H04M 1/725* | (2006.01) | |
| *H04W 88/02* | (2009.01) | |
| *H04W 8/24* | (2009.01) | |

(52) U.S. Cl.
CPC ............ *G06K 7/10158* (2013.01); *H02J 7/35* (2013.01); *H04B 1/40* (2013.01); *H04W 4/029* (2018.02); *H02J 7/345* (2013.01); *H04M 1/72519* (2013.01); *H04M 1/72522* (2013.01); *H04W 8/245* (2013.01); *H04W 88/02* (2013.01)

(58) Field of Classification Search
CPC ............. G06K 7/10158; G06K 7/0008; G06K 19/0723; H04W 4/029; H04W 64/00; H04W 4/02; H04W 8/245; H04W 88/02; H02J 7/35; H02J 7/345; H04B 1/40; H04L 29/08657
USPC ................................. 455/456.2, 418, 550.1
See application file for complete search history.

(56) References Cited

U.S. PATENT DOCUMENTS

| | | |
|---|---|---|
| 9,810,767 B1 | 11/2017 | Hamilton |
| 2007/0046434 A1 | 3/2007 | Chakraborty |
| 2010/0177076 A1* | 7/2010 | Essinger .............. G09G 3/3433 345/207 |
| 2011/0072132 A1 | 3/2011 | Shafer |
| 2011/0080267 A1 | 4/2011 | Clare |
| 2011/0121654 A1* | 5/2011 | Recker .................... H02J 9/065 307/66 |

(Continued)

*Primary Examiner* — Danh C Le
(74) *Attorney, Agent, or Firm* — Frank M. Scutch, III

(57) ABSTRACT

An energy harvesting tag for use in a real time location system (RTLS) includes a battery powered transceiver where a photocell and energy storage device are used to provide power to the transceiver and a microprocessor when the battery is dead or inoperative.

11 Claims, 2 Drawing Sheets

(56) References Cited

U.S. PATENT DOCUMENTS

| | | |
|---|---|---|
| 2012/0080944 A1* | 4/2012 | Recker .................... H02J 9/02 |
| | | 307/25 |
| 2013/0141233 A1 | 6/2013 | Jacobs |
| 2013/0201003 A1 | 8/2013 | Sabesan |
| 2013/0217979 A1* | 8/2013 | Blackadar ............ A61B 5/0024 |
| | | 600/301 |
| 2014/0351498 A1 | 11/2014 | Hsueh |
| 2015/0063472 A1 | 3/2015 | Chatterton |
| 2016/0029160 A1 | 1/2016 | Theurer |
| 2016/0295358 A1 | 10/2016 | Cariss |
| 2016/0295376 A1 | 10/2016 | Geng et al. |
| 2016/0330825 A1* | 11/2016 | Recker ............... H05B 37/0272 |
| 2017/0133953 A1* | 5/2017 | Gross .................... H02N 2/181 |
| 2017/0142549 A1 | 5/2017 | Herbert |
| 2017/0294691 A1* | 10/2017 | Yamamoto ............... H02J 7/34 |
| 2017/0313426 A1 | 11/2017 | Morin |
| 2018/0239999 A1* | 8/2018 | Gayton .................. G06Q 50/28 |

* cited by examiner

REAL-TIME LOCATION SYSTEM (RTLS) TAG WITH BATTERY AND ENERGY HARVESTING, WHICH TRANSMITS A LOCATION SIGNAL WHEN THE BATTERY IS INOPERATIVE

FIELD OF THE INVENTION

The present invention relates generally to a real-time location system (RTLS) and more particularly to a Bluetooth (BLE) RTLS having active tags and other active components which harvest energy to report when their batteries are dead or inoperative.

BACKGROUND

Real-time location systems (RTLS) are technology solutions that automatically identify and track the location of objects or people in real time, in most cases within a building such as a warehouse, shipping yard, hospital, or campus. In a typical implementation, wireless RTLS tags are affixed to objects or worn by people, and fixed reference points receive wireless signals from these tags to determine their location. Tags and fixed reference points can be transmitters, receivers or both, and this flexibility allows for multiple possible combinations. These solutions enable organizations to more effectively keep track of where things are, which can help them improve processes they are currently struggling with, such as inventory management.

RTLS systems are designed to replace outdated, less efficient solutions such as spreadsheets and clipboards, by automating tasks that are now largely manual and prone to errors. The RTLS systems are also valuable to businesses because they generate intelligence: Useful data about product and asset movement within facilities, how quickly processes are being completed, and what organizations such as hospitals can do to speed up services. Data gathered by these systems can be stored, analyzed, audited, and assessed by internal parties or external authorities such as public safety organizations.

Applications of RTLS typically aim to improve operational processes and workflows; safety and security; inventory management, or a combination of all of these. RTLS solution implementation can help organizations address specific challenges they are facing related to a range of causes including resource inefficiencies and even employee endangerment.

In the healthcare sector, hospitals and clinics can use the technology to track and manage assets such as medical equipment, through real-time visibility into the location and status of the equipment. This can potentially reduce inventory costs, cut down on the time it takes nurses, technicians and other healthcare professionals to locate missing equipment, reduce theft of high-cost systems, and automate the maintenance of equipment. Healthcare facilities can also decrease the amount of time patients have to wait between procedures, through automated alerting and monitoring of patient activity or inactivity. They can also enhance the safety of patients by keeping track of their whereabouts within a facility. One of the unique attributes of RTLS that makes it applicable to so many applications and industries is its ability to track the location of so many different types of assets, whether it's equipment, tools, shipping containers, measurement devices or vehicles. Knowing the exact location and condition of assets can help companies improve workflow processes—regardless of the type of business they provide.

RTLS is also valuable because it can be used to track people. For industries such as healthcare, the benefits of this are clear: hospital administrators can follow a patient's journey through the emergency room, admission process, operating room, and hospital room—all the way through discharge. Tracking such metrics as wait times during these various stages in the patients' journey helps administrators to better address potential patient flow challenges. People-tracking using RTLS can also be used to improve safety. Through the use of security badges, people who work in harsh environmental conditions and remote processing plants can be tracked in case of emergencies. The technology can not only track the location of objects but their condition as well, through such capabilities as remote temperature and humidity monitoring. Industries that rely on products or materials being managed in optimal conditions, such as healthcare, food processing, pharmaceuticals, chemicals, etc., can benefit from ensuring that these products are stored and kept in the best possible conditions. The potential benefits include cost savings and, even more important, public safety.

RTLS configurations can vary significantly depending on what type of facilities the technology is being used in, the type of system, how it is being used, what types of products are being tracked, what conditions are being monitored, etc. A key piece of the RTLS configuration is the badge or "tag" that is used to provide location information. Tags are attached to whatever assets, equipment, or materials an organization wants to track, while badges are worn by people who can be tracked or who use the system to trigger alerts. These lightweight tags or badges transmit radio frequency signals periodically to access points, and subsequently to RTLS software. A single implementation can support as many as thousands of tags, but most deployments start much smaller and can be scaled up as needed. In "Active Tag" systems, the tags carry batteries which power the tag's operation for a period of months or years, until the battery dies or is replaced.

RTLS systems with active tags usually employ a process to monitor the battery status of the tag, and attempt to alert or warn system managers when a tag is reaching a low-battery status and needs to be serviced. Unfortunately, these processes are often unsuccessful in notifying the system's manager in time, or the system's manager is unable to replace the battery or tag before the battery fails. Once a battery fails on a tag or badge, and the asset or person moves to a new location, their location changes are invisible to the RTLS system. It becomes very difficult to find a dead-battery tag for several reasons: the tag can be carried anywhere within a large building like a hospital, and a dead tag looks exactly like a live tag, so a visual inspection is no help. Large-scale failures of 5% or 10% of tag batteries often cause a system's location reports to become unreliable, since a significant fraction of the tagged assets or people are not reporting to the system, and users lose faith in the ability of the system to track the tagged items and badged personnel. The value, efficiencies and safety features of the system are inhibited when large numbers of tag and badge batteries are dead.

Often, the RTLS system includes radio-communicating, battery-powered infrastructure devices as well, like beacons, sensors, or exciters, which provide a location reference or location-reference signal. These battery-powered devices are commonly monitored for battery life. While they are easier to service when they reach low-battery status because their locations are fixed, the system managers may find it difficult to monitor these dead-battery devices since they are no longer in radio communication with the network.

Some non-RTLS sensory systems are beginning to be introduced into the market which use energy harvesting to power the sensors. These devices lack a battery. Their advantage is that they do not have a battery that dies and renders the sensor useless. However, even with state-of-the art energy harvesting, the use of energy-harvesting technology alone is not practical for powering RTLS tags for their entire useful life. In practice, either the energy harvesting circuitry makes the tag so large as to be impractical for tagging small assets, or the energy-harvesting circuitry does not harvest enough energy to power a tag that can be located accurately at low latency.

SUMMARY OF THE INVENTION

An RTLS system having active tags for providing asset and personnel location. Unlike RTLS systems in current deployment, these active tags feature both a battery, and energy-harvesting circuitry, and operate in two power modes at various times, switching between the two modes. When a tag's battery provides adequate power, the tag uses a first operating mode which uses the battery to transmit frequent locating signals, for low-latency and high-accuracy locating. But when a tag's battery fails, the tag switches to a second operating mode. The second operating mode uses the energy-harvested power to transmit less-frequent locating signals, so that the tag can continue to be located when the battery is dead or at an inoperative level.

"Adequate power" for the first operating mode is defined as battery power sufficient to energize the tag's microprocessor and radio transceiver to successfully format, generate and send a radio transmission that the RTLS can use to locate the tag.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
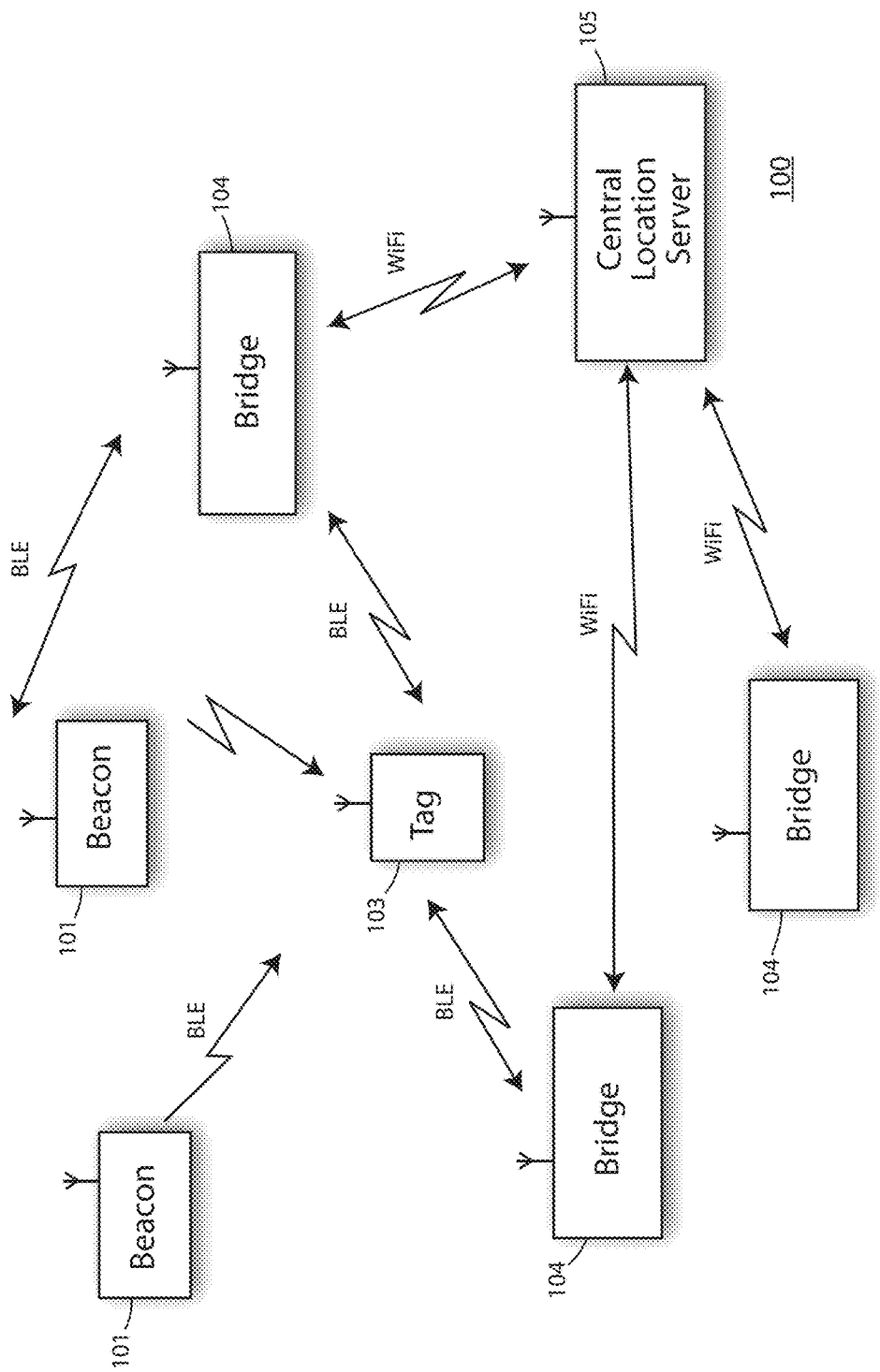
FIG. 1 a block diagram illustrating components in an RTLS in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an RTLS having tags that harvest energy for operation when their battery is dead. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of RTLS having energy-harvesting tags, bridges with mode-instruction, and tags, bridges and beacons that self-report location changes. The non-processor circuits may include, but are not limited to, a radio receiver, a radio transmitter, signal drivers, clock circuits, power source circuits, and user input devices. As such, these functions may be interpreted as steps of a method to perform energy-harvesting tags, bridges with mode-instruction, and tags, bridges and beacons that self-report location changes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 a block diagram illustrating components that may be used in the RTLS in accordance with various embodiments of the invention. The system 100 may include zero or more beacon transmitters 101 that operate using a BLE signal transmission to one or more tags 103 placed on/with various moveable assets around a location such as a hospital. The tag 103 transmits a radio signal to one or more bridges 104 via a radio protocol such as Bluetooth Low Energy (BLE) where the signal strength or location information and other updated data is retransmitted by the bridge to a central location server 105. As is already typical in the industry, the central server processes its received data to update and store the estimated location of the tag.

Figure 2:
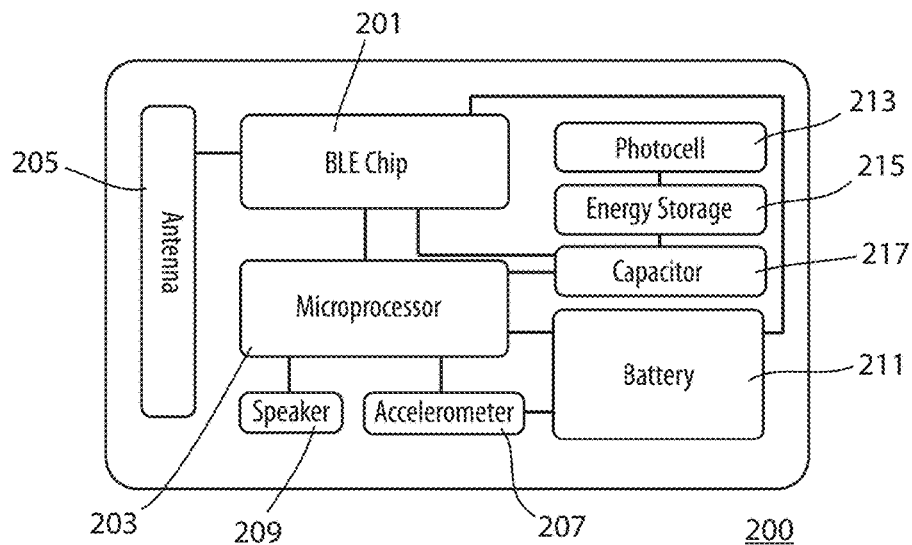
FIG. 2 is a block diagram illustrating components used in the tag.

FIG. 2 is a block diagram illustrating system components used in the tag as seen in FIG. 1, in some embodiments of the invention. The tag 200 includes a low energy BLE transceiver 201 that works to transmit and receive Bluetooth RF signals. The BLE transceiver 201 is connected to a microprocessor 203 for controlling the operation of the transceiver. The BLE transceiver is also connected to an antenna for providing communication to other devices. The tag further includes an accelerometer 207 connected to microprocessor 203 for detecting motion of the tag and an optional speaker 209 for providing audible tones or other indicia for use in locating a misplaced or out-of-sight tag. The tag 200 further includes a unique power management system where a battery 211 is connected to the microprocessor 203 and accelerometer 207 where the battery 211 works to power these devices in one operating mode. In the event the battery is below some predetermined threshold and/or is dead or spent, a photocell 213 using light energy or other energy harvester can be used to power the device for specific tasks. More specifically, the photocell 213 or other energy harvester connects to an energy storage device 215 that works to charge the storage device 215 for use in tasks requiring short bursts of energy to power the tag 200. The energy storage 215 then charges a capacitor 217, connected to the BLE transceiver 201 and microprocessor 203, for energizing these devices for such limited periods of time e.g. when the tag is misplaced and has a dead battery.

Thus, the tag 200 includes a novel feature not taught in the prior art namely: the tag 200 is rarely spent nor will it ever be fully discharged since it will not die due to battery depletion. The photocell or other energy harvester 213 and energy storage 215 are used to provide energy for operating the tag for limited periods. Using this technique, when the battery is depleted, the photocell charges the energy storage device 215 for operating the tag 200 for limited tasks including running an initialization process, executing software in the tag, transmitting a message that can be used for tag location Those skilled in the art will recognize that energy harvesting in itself is not unique, but has been employed in other wireless sensors. Although battery-powered tags are common in the RTLS industry, the use of two energy sources with load-sharing or switching is novel. Current devices often require more energy than can be harvested in a hospital environment, and a balancing of the two sources i.e. battery power and energy harvesting is difficult and impractical. But the current invention is unique in its ability to employ battery and energy harvesting in two operating modes that can be optimally combined and dynamically chosen with a simple switchover. These processes are employed for the explicit purpose of using the battery when it has sufficient energy to achieve low-latency, highly-accurate locating, but also use the energy harvesting when necessary to achieve high-latency, sufficiently-accurate locating for dead-battery tags.

Figure 3:
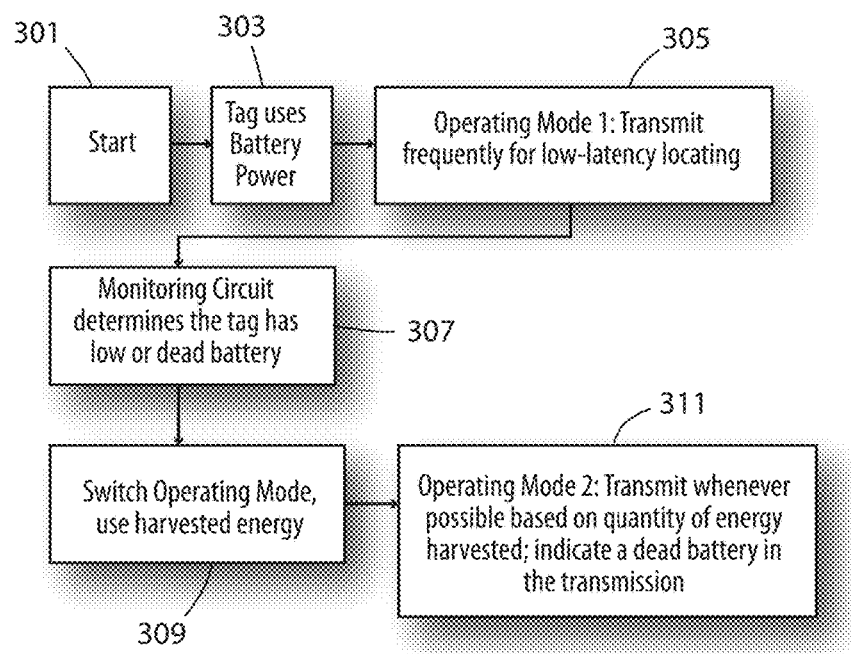
FIG. 3 is a flow chart diagram illustrating processes used by a tag in accordance with some embodiments of the invention.

FIG. 3. is a flow chart outlining the process 300 by which the tag optimally uses both power sources. The process starts 301 with the tag using the battery power 303. The tag will use the battery power to operate in Operating Model, transmitting frequently enough to achieve low-latency and highly accurate locations 305. Energy harvesting may occur when the tag is in Operating Mode 1 but the harvested energy is never used. However, when the battery nears or reaches exhaustion as determined by the tag's internal status monitoring 307 while in a first operating mode (Operating Mode 1), the tag will perform a simple switchover 309 to a second operating mode (Operating Mode 2), at which time the tag uses harvested energy to send infrequent transmissions 311, including an indication that the tag is operating in a dead-battery status, achieving high-latency but survivable locating by the RTLS system. Hence, the tag operates in a first mode of operation when the tag provides adequate battery power and a second mode of operation when the tag provides less than adequate battery power. As described herein, "adequate power" for the first operating mode is defined as battery power sufficient to energize the tag's microprocessor and radio transceiver to successfully format, generate and send a radio transmission that the RTLS can use to locate the tag. Less than adequate power occurs when the battery cannot perform one or more of these functions.

Thus, the present invention describes a new wireless technology available for RTLS systems in healthcare that makes the RTLS more reliable and a long-lived survivability for use in hospitals. Hospitals may survive a period of battery depletion which causes tags to become un-locatable and un-serviceable. Instead, tags can transmit a location signal at some periodic interval, e.g. at least once per day. This allows the system manager to locate the dead-battery tag(s), service it, and return it to normal operating mode, without having to search an entire hospital for a non-reporting, dead-battery tag.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A tag for use in a real-time locating system (RTLS) having energy harvesting tags, beacons, bridges, and a central location server for providing people and asset tag locating, the RTLS system comprising:

at least one beacon equipped with a motion sensor and transmitting motion status sensed at a beacon location;

at least one bridge for receiving those radio transmissions from the at least one beacon such that the radio transmissions include motion-status information for the location where the beacon is mounted and forwarding the motion status to a location engine server, and further where the at least one bridge receives radio transmissions from at least one tag and measures characteristics of the received tag transmissions, including received signal strength at least one energy-harvesting tag for wirelessly transmitting its identification to the at least one bridge, where the at least one tag includes an accelerometer for reporting its motion status to the at least one bridge and a location engine server;

a central location-engine server utilizing a plurality of location-determining methods comprising:

a first location method for calculating a first location estimate for the at least one tag, based on characteristics of advertisements transmitted by the at least one tag, received by a fixed infrastructure of bridges, and transmitted to the central location server;

a second location method for calculating a second location estimate for the at least one tag, based on comparing changes in the history of motion status in the beacons' rooms, coincident changes in the received signal strength of advertisements from tags, and the coincident history of changes in accelerometer-determined motion status of one or more tags that are likely in the room; and a third location method for combining the first and second location estimates to determine a location result for the at least one tag;

where the at least one energy-harvesting tag is comprised of:

a wireless transceiver;

a microprocessor for operating the transceiver;

a battery for powering the transceiver and microprocessor;

an energy harvesting device connected to an energy storage device;

a capacitor connected to the energy storage device; and wherein the energy harvesting device charges the energy storage device so the capacitor can power the microprocessor and transceiver for performing limited tasks upon battery depletion.

2. An energy harvesting tag system for use in a real-time location system (RTLS) for providing people and asset tag locating, comprising:

at least one energy-harvesting tag wirelessly transmitting its identification to at least one bridge;

an accelerometer for reporting the asset tag's motion status; and wherein the RTLS further comprises:

at least one beacon equipped with a motion sensor for transmitting motion status sensed at a beacon location;

at least one bridge for receiving those radio transmissions from the at least one beacon such that the radio transmissions include motion-status information for the location where the beacon is mounted and forwarding the motion status to a location engine server, and further where the at least one bridge receives radio transmissions from at least one tag and measures characteristics of the received tag transmissions, including received signal strength;

at least one energy-harvesting tag for wirelessly transmitting its identification to the at least one bridge, where the at least one tag includes an accelerometer for reporting its motion status to the at least one bridge and a location engine server;

a central location-engine server for receiving motion status information and utilizing a plurality of location-determining methods comprising:

a first location method for calculating a first location estimate for the at least one tag, based on characteristics of advertisements transmitted by the at least one tag, received by a fixed infrastructure of bridges, and transmitted to the central location server;

a second location method for calculating a second location estimate for the at least one tag, based on comparing changes in the history of motion status in the beacons' rooms, coincident changes in the received signal strength of advertisements from tags, and the coincident history of changes in accelerometer-determined motion status of one or more tags that are likely in the room; and a third location method for combining the first and second location estimates to determine a location result for the at least one tag.

3. The energy harvesting tag system as in claim 2, wherein the tag comprising:

a wireless transceiver;

a microprocessor for operating the transceiver;

a battery for powering the transceiver and microprocessor;

an energy harvesting device connected to an energy storage device;

a capacitor connected to the energy storage device; and wherein the energy harvesting device charges the energy storage device so the capacitor can power the microprocessor and transceiver for performing limited tasks upon battery depletion.

4. The energy harvesting tag system as in claim 3, wherein the tag can transmit with a dead battery.

5. The energy harvesting tag system as in claim 3, wherein the tag operates in a first mode of operation when the tag provides adequate battery power and a second mode of operation when the tag provides less than adequate battery power.

6. The energy harvesting tag system as in claim 5, wherein the first mode of operation is a frequent transmission, and the second mode of operation is a less frequent transmission.

7. The energy harvesting tag system as in claim 2, the beacon comprising:

a transceiver;

a microprocessor for operating the transceiver;

a battery for powering the transceiver and the microprocessor;

an energy harvesting device connected to an energy storage device;

a capacitor connected to the energy storage device and microprocessor; and wherein the energy harvesting device charges the energy storage device so the capacitor can power the microprocessor and transceiver for performing limited tasks upon battery depletion.

8. The energy harvesting tag system as in claim 2, the tag comprising:

a wireless transceiver;

a microprocessor for operating the transceiver;

a battery for powering the transceiver and microprocessor; and an energy harvesting device connected to an energy storage device; and wherein the energy harvesting device charges the energy storage device to power the microprocessor and transceiver for performing limited tasks upon battery depletion.

9. The energy harvesting tag system as in claim 8, wherein the tag can transmit with a dead battery.

10. The energy harvesting tag system as in claim 8, wherein the tag operates in a first mode of operation when the tag provides adequate battery power and a second mode of operation when the tag provides less than adequate battery power.

11. The energy harvesting tag system of claim 10, wherein the first mode of operation is a frequent transmission, and the second mode of operation is a less frequent transmission.

* * * * *